United States Patent
Funakura

(10) Patent No.: US 8,448,976 B2
(45) Date of Patent: May 28, 2013

(54) STROLLER

(75) Inventor: Kenji Funakura, Tokyo-To (JP)

(73) Assignee: Combi Corporation, Tokyo (JP)

( * ) Notice: Subject to any disclaimer, the term of this patent is extended or adjusted under 35 U.S.C. 154(b) by 689 days.

(21) Appl. No.: 12/595,193

(22) PCT Filed: Apr. 2, 2008

(86) PCT No.: PCT/JP2008/056550
§ 371 (c)(1),
(2), (4) Date: Nov. 6, 2009

(87) PCT Pub. No.: WO2008/126735
PCT Pub. Date: Oct. 23, 2008

(65) Prior Publication Data
US 2010/0109271 A1    May 6, 2010

(30) Foreign Application Priority Data

Apr. 9, 2007   (JP) .................................. 2007-101738

(51) Int. Cl.
*B62B 7/08*        (2006.01)
(52) U.S. Cl.
CPC ....................................... *B62B 7/08* (2013.01)
USPC .......................................... 280/642; 280/650
(58) Field of Classification Search
CPC ....................................................... B62B 7/08
USPC .................. 280/47.36, 47.38, 642, 643, 647, 280/648, 649, 650, 657, 658
See application file for complete search history.

(56) References Cited

U.S. PATENT DOCUMENTS

| | | | |
|---|---|---|---|
| 4,779,879 A | 10/1988 | Kassai | |
| 5,215,320 A | 6/1993 | Chen | |
| 5,823,547 A * | 10/1998 | Otobe et al. | 280/30 |
| 6,298,949 B1 * | 10/2001 | Yang et al. | 188/20 |
| 6,964,083 B2 * | 11/2005 | Nagai et al. | 16/35 R |
| 7,861,370 B2 * | 1/2011 | Chu | 16/35 R |
| 2006/0071452 A1 * | 4/2006 | Yeh | 280/642 |
| 2010/0127481 A1 * | 5/2010 | Funakura | 280/658 |

FOREIGN PATENT DOCUMENTS

| | | |
|---|---|---|
| DE | 9112253.8 U1 | 11/1991 |
| EP | 0260056 A2 | 3/1988 |
| JP | 63-184567 A | 7/1988 |
| JP | 2002-284015 A | 10/2002 |
| JP | 2005-280451 A | 10/2005 |
| JP | 2006-117012 A | 5/2006 |

OTHER PUBLICATIONS

Chinese Office Action dated Dec. 31, 2010 for Application No. 200880011282.8.

* cited by examiner

*Primary Examiner* — Hau Phan
*Assistant Examiner* — Jacob Meyer
(74) *Attorney, Agent, or Firm* — Birch, Stewart, Kolasch & Birch, LLP

(57) ABSTRACT

A stroller allowing an operation for switching the conditions of the wheels in accordance with a position of the handle to be performed in a more stable and reliable manner is provided. The stroller includes a frame part; a handle swingably connected to the frame part; caster mechanisms that turnably hold wheels; and a switch mechanism having a switching member disposed on the handle. The caster mechanisms are provided with locking member for restricting turnings of the wheels. The switching member is movable about a swing center of the handle in accordance with a swinging of the handle. A transmission member operates the locking member in conjunction with an action of the switch mechanism.

12 Claims, 11 Drawing Sheets

STROLLER

FIELD OF THE INVENTION

The present invention relates to a stroller including a handle that is swingable between a forward inclined position and a rearward inclined position. In particular, the present invention pertains to a stroller in which wheels disposed on front legs or rear legs can be automatically switched, in accordance with a position of the handle, into a turnable condition or an unturnable condition relative to the back and forth direction of the stroller.

BACKGROUND ART

There have been conventionally known strollers for carrying a baby facing forward in the traveling direction. In addition, widely used in recent years are strollers including a handle that is swingable between a first position (front pushing position) at which the handle is inclined forward of a vertical axis when viewed from the lateral side, and a second position (back pushing position) at which the handle is inclined rearward of the vertical axis. In such a stroller, when the handle is arranged on the second position, an operator (parent) can push forward the stroller with the baby facing forward in the traveling direction, grasping the handle from a back side of the baby. On the other hand, when the handle is arranged on the first position, the operator can push forward the stroller with the rear legs facing forward in the traveling direction, grasping the handle from a side of the front legs on which the operator faces the baby.

In consideration of manipulability of the stroller, it is preferable that wheels disposed on the legs facing forward in the traveling direction are turnable relative to the back and forth direction, while wheels on the legs facing rearward in the traveling direction are unturnable relative to the back and forth direction. JP2002-284015A discloses a stroller in which the wheels disposed on the front legs and the rear legs can be automatically switched, in accordance with a position of the handle, into the turnable condition or the unturnable condition relative to the back and forth direction.

In the stroller disclosed in JP2002-284015A, sliding members (lock switching members) are slidably provided on the front legs. The sliding members are pushed to be slid by the handle which is being swung toward the first position (front pushing position), whereby the wheels can be switched to the turnable condition or the unturnable condition.

However, inclined angles of the front legs and a swinging range of the handle are set in relation to other structures of the stroller, in terms of comfortableness and manipulability. In general, a swing center of the handle is not positioned near the front legs on which the sliding members are provided. Namely, the sliding members are located remote from the swing center of the handle. Thus, when there is a larger allowance while the handle is swung, there is a possibility that the sliding members cannot be operated by the handle in a stable and reliable manner.

DISCLOSURE OF THE INVENTION

The present invention has been made in view of this respect. The object of the present invention is to provide a stroller allowing an operation for switching the conditions of the wheels in accordance with a position of the handle to be performed in a more stable and reliable manner.

The present invention is a stroller comprising: a frame part including a front leg and a rear leg; a handle swingably connected to the frame part; a caster mechanism disposed at least on one of the front leg and the rear leg, the caster mechanism including a wheel, a wheel holder configured to rotatably and turnably hold the wheel, and a locking means capable of moving between a locking position for restricting a turning of the wheel and an unlocking position for enabling the turning of the wheel; a switch mechanism including a switching member that is disposed on the handle and is capable of acting about a swing center of the handle in accordance with a swinging of the handle; and a transmission means disposed between the switch mechanism and the caster mechanism, and configured to transmit an action of the switch mechanism to the locking means so as to move the locking means from the unlocking position to the locking position, or from the locking position to the unlocking position.

In the stroller of the present invention, the switching member may be disposed on the swing center of the handle and may be rotatable about the swing center of the handle in accordance with the swinging of the handle. Alternatively, in the stroller of the present invention, the switching member may be positioned near the swing center of the handle and may be movable about the swing center of the handle in accordance with the swinging of the handle.

In addition, in the stroller of the present invention, the switch mechanism may further include a sliding member that is disposed on the rear leg and is capable of sliding with respect to the rear leg, and the switching member may include a contact surface that is brought into contact with the sliding member so as to slide the sliding member along the rear leg, when the switching member acts in accordance with the swinging of the handle. In such a stroller, it is preferable that the swing center of the handle is positioned near the rear leg. In such a stroller, the transmission means may include a wire whose opposed ends are respectively fixed to the sliding member of the switch mechanism and the locking means of the caster mechanism. In this case, the caster mechanism may include a caster mechanism for front leg disposed on a lower end of the front leg, and the wire may be extended in the rear leg of the frame part to an upper end of the rear leg, and may be further extended in the front leg from an upper end of the front leg to the caster mechanism for front leg.

Alternatively, in the stroller of the present invention, the transmission means may include a wire whose opposed ends are respectively fixed to the switching member of the switch mechanism and the locking means of the caster mechanism.

Alternatively, in the stroller of the present invention, the switching member may be a plate-like member that is disposed on the swing center of the handle, and is rotatable about the swing center of the handle in accordance with the swinging of the handle, the transmission means may include a wire whose opposed ends are respectively fixed to the switching member of the switch mechanism and the locking means of the caster mechanism, and the swing center of the handle may be positioned near the rear leg, and the transmission means, which is held by the rear leg, is extended to the switching member of the switch mechanism.

Further, in the stroller of the present invention, the transmission means may further include a tubular member held by the frame part, and the wire may pass through the tubular member so as to be slidable with respect to the tubular member.

Further, in the stroller of the present invention, the transmission means may be held on an outer surface of the front leg or an outer surface of the rear leg of the frame part. Alternatively, in the stroller of the present invention, the wire may be extended in the front leg or the rear leg of the frame part.

Further, in the stroller of the present invention, the caster mechanism may include a caster mechanism for front leg disposed on a lower end of the front leg and a caster mechanism for rear leg disposed on a lower end of the rear leg, and the first transmission means may include a first transmission disposed between the caster mechanism for front leg and the switch mechanism and a second transmission means disposed between the caster mechanism for rear leg and the switch mechanism. In such a stroller, when the handle is swung rearward of the stroller, the turning of the wheel of the caster mechanism for front leg may be enabled, while the turning of the wheel of the caster mechanism for rear leg may be restricted, and when the handle is swung forward of the stroller, the turning of the wheel of the caster mechanism for front leg may be restricted, while the turning of the wheel of the caster mechanism for rear leg may be enabled.

According to the stroller of the preset invention, it is possible to perform an operation for switching the conditions of the wheels in accordance with a position of the handle in a more stable and reliable manner.

MODE FOR CARRYING OUT THE INVENTION

Figure 1:
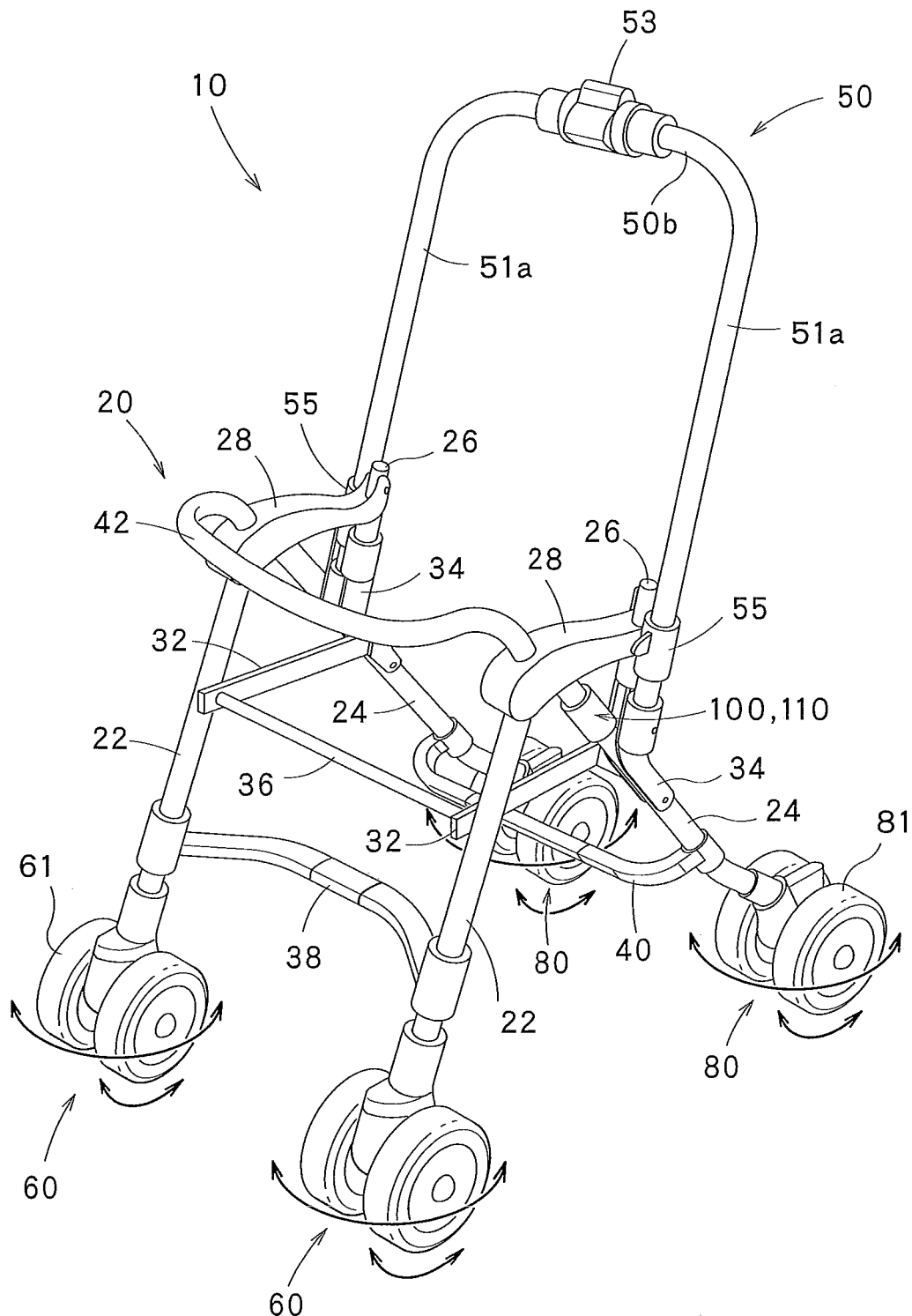
FIG. 1 is a perspective view for explaining an overall structure of a stroller in one embodiment of the present invention.

One embodiment of the present invention will be described below with reference to the drawing.

Figure 2:
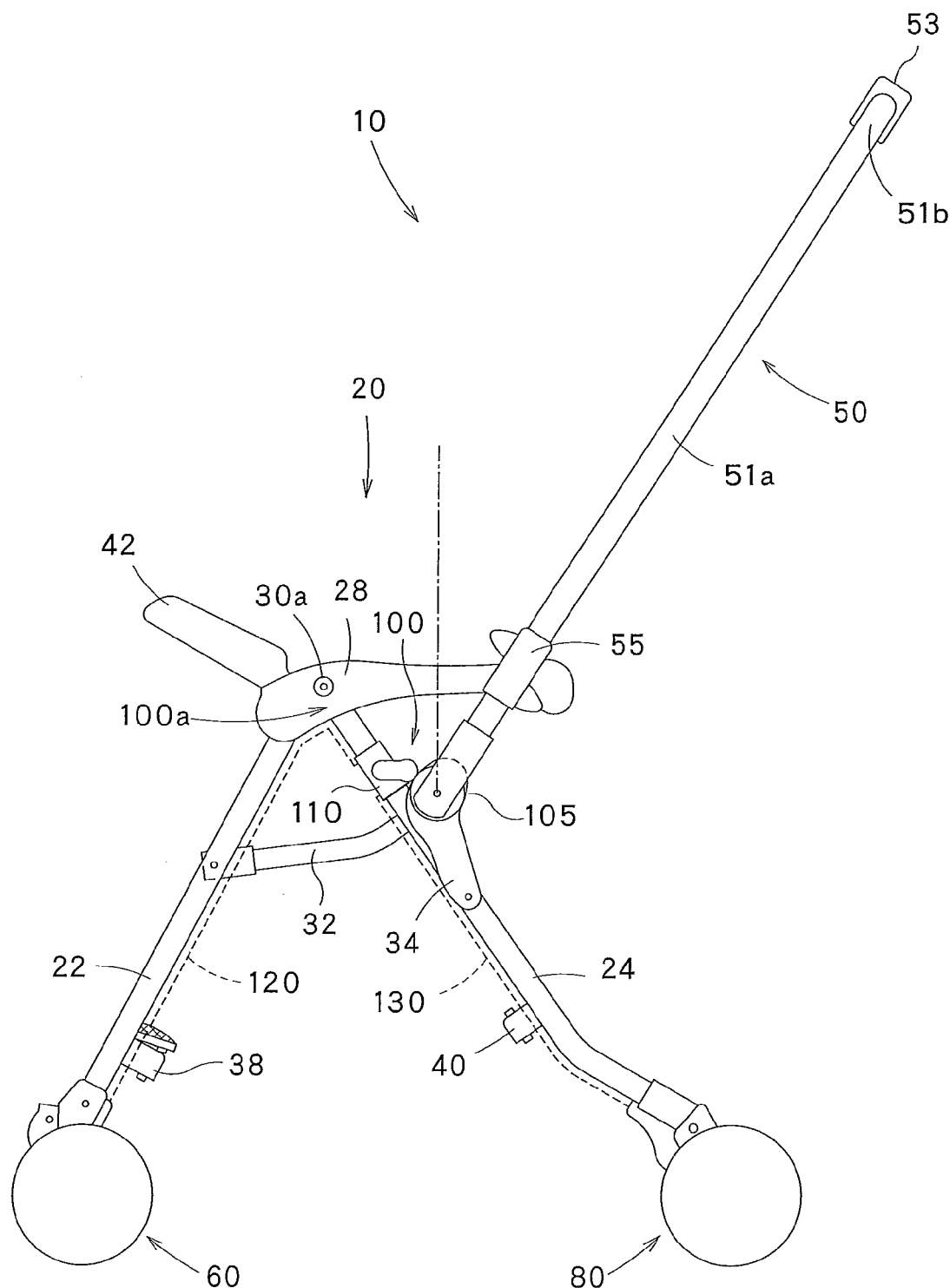
FIG. 2 is a side view of the stroller, with a handle thereof being arranged on a second position (backside pushing position)
Figure 3:
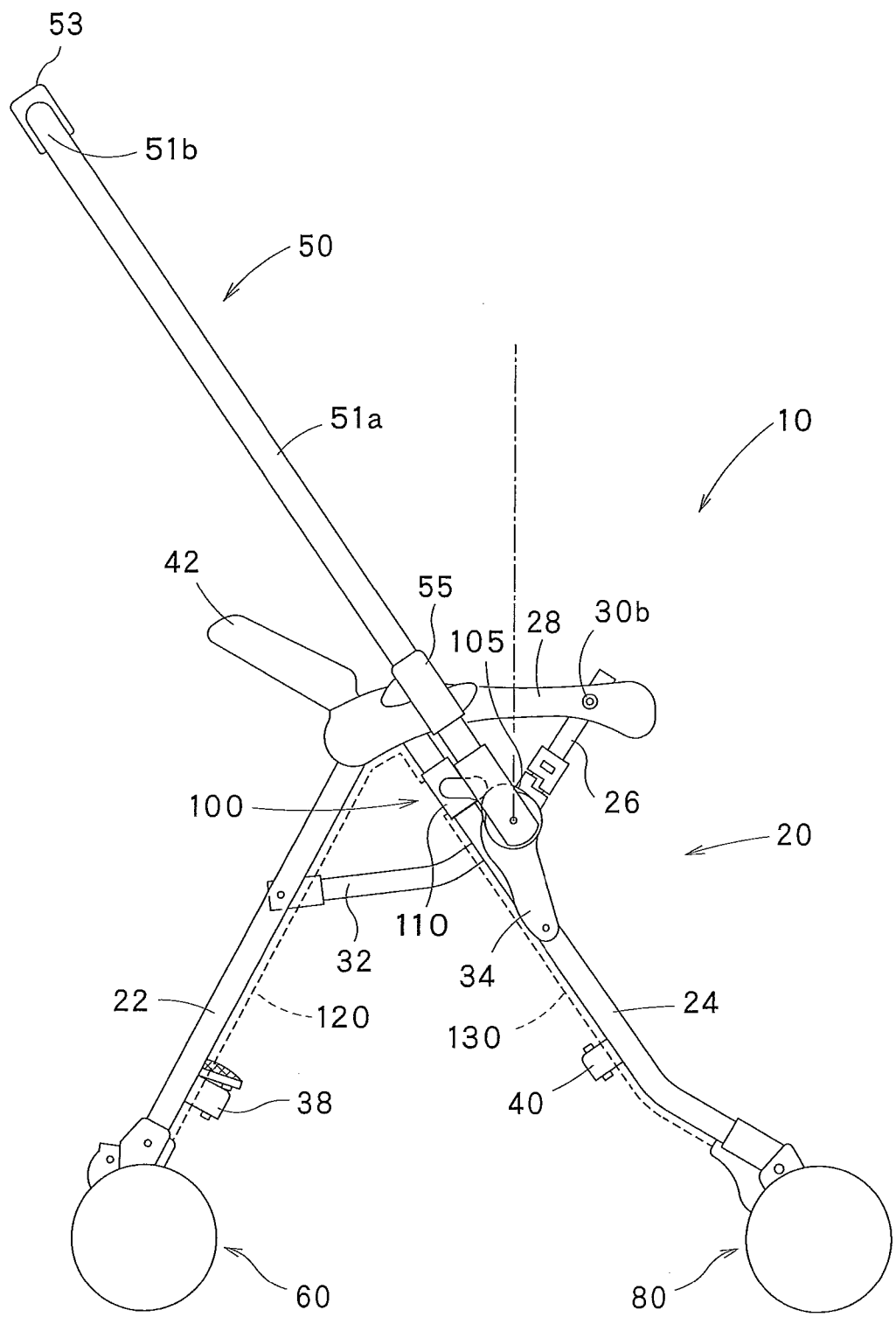
FIG. 3 is a side view of the stroller, with the handle being arranged on a first position (face-to-face pushing position)

FIGS. 1 to 11 are views for explaining a stroller in one embodiment of the present invention. FIGS. 1 to 3 show an overall structure of the stroller. As show in FIGS. 1 to 3, the stroller 10 includes a frame part 20 having front legs 22 and rear legs 24, and a handle 50 swingably connected to the frame part 20. Disposed on a lower end of the front leg 22 of the frame part 20 is a caster mechanism for front leg 60 having a front wheel 61. Disposed on a lower end of the rear leg 24 of the frame part 20 is a caster mechanism for rear leg 80 having a rear wheel 81.

In this embodiment, similarly to prevalent strollers (see, JP2006-117012A, for example), the stroller 10 is configured to be foldable. In the stroller 10 in this embodiment, it is both possible, by swinging the handle 50 with respect to the frame part 20, to steer the stroller 10 with the baby facing forward in the traveling direction, while an operator (parent) grasps the handle 50 from a back side of the baby, and to steer the stroller 10 with the rear leg of the stroller 10 facing forward in the traveling direction, while the operator grasps the handle from a side of the front leg on which the operator faces the baby.

In this specification, the terms "front", "rear", "up", "down", "back and forth direction", and "up and down direction" with respect to the stroller mean, unless otherwise specified, "front", "rear", "up", "down", "back and forth direction", and "up and down direction", with respect to a baby in the unfolded stroller 10. More specifically, the "back and forth direction" of the stroller 10 corresponds to a direction connecting a lower left part and an upper right part in a plane of FIG. 1, and a right and left direction in a plane of each of FIGS. 2 and 3. Unless otherwise specified, the "front" is a side to which the baby in the stroller faces. The lower left side in the plane of FIG. 1 and the left side of the plane of each of FIGS. 2 an 3 correspond to the front side of the stroller 10. The "up and down direction" of the stroller 10 is a direction perpendicular to the back and forth direction, and is a direction perpendicular to the ground on which the stroller 10 rests. Thus, when the ground surface is a horizontal surface, the "up and down direction" represents a vertical direction. The "lateral direction" is a width direction, and is a direction perpendicular both to the "back and forth direction" and the "up and down direction".

At first, as an overall structure of the stroller, the frame part 20 and the handle 50 are described. As shown in FIG. 1, the stroller 10 in this embodiment has substantially a symmetrical structure as a whole, with respect to a lateral center plane containing the back and forth direction. As shown in FIGS. 1 to 3, the frame part 20 in this embodiment includes a pair of legs 22 respectively disposed on the right side and the left side, a pair of rear legs 24 respectively disposed on the right side and the left side, a pair of armrests 28 respectively disposed on the right side and the left side, and a pair of connecting rods 26 respectively disposed on the right side and the left side.

The front legs 22, the rear legs 24, and the connecting rods 26 may be formed of tubular members, for example, pipes made of an aluminum alloy. Meanwhile, the armrests 28 may be formed of a resin, for example. An upper end of each of the front legs 22 is rotatably (swingably) connected to a front section of the corresponding (right or left) armrest 28. Similarly, an upper end of each of the rear legs 24 is rotatably (swingably) connected to the front section of the corresponding (right or left) armrest 28. An upper portion of each of the connecting rods 26 is rotatably (swingably) connected to a rear section of the corresponding (right or left) armrest 28.

The frame part 20 further includes a left lateral side connecting member 32 that connects the left front leg 22 and the left connecting rod 26, and a right lateral side connecting member 32 that connects the right front leg 22 and the right connecting rod 26. A front portion of each of the lateral side connecting members 32 is rotatably connected to an intermediate section of the front leg 22. A rear portion of each of the lateral side connecting members 32 is rotatably connected to a lower section of the connecting rod 26. The lateral side connecting member 32 may be formed of a plate member made of an aluminum alloy, for example. The frame part 20 further includes a left bracket 34 that connects the left rear leg 24 and the left connecting rod 26, and a right bracket 26 that connects the right rear leg 24 and the right connecting rod 26. Each of the brackets 34 is rotatably (swingably) connected, at one portion thereof, to an intermediate section of the rear leg 24, and is rotatably connected, at the other portion thereof, to a lower section of the connecting rod 26.

As laterally extending constituent elements, the stroller 10 in this embodiment includes a pair of front upper connecting stay 36 and a footrest 28 that connect the pair of front legs 22, and a rear upper connecting stay 40 that connects the pair of rear legs 24. A bendable guard member 42 connecting the pair of armrests 28 is detachably mounted on the respective armrests 28.

The handle 50 is swingably connected to the frame part 20 as structured above. As shown in FIG. 1, in this embodiment, the handle 50 includes a pair of linear portions 51a extending substantially linearly in parallel with each other, and an intermediate portion 51b that connects the pair of linear portions 51a. The handle 50 generally has a substantially U-shape. Opposed ends of the U-shaped handle 50 are rotatably (swingably) connected to the corresponding brackets 34. A rotational axis line (swing center) of the handle 50 with respect to the brackets 34 corresponds to a rotational axis of the brackets 34 with respect to the connecting rods 26, and a rotational axis line of the connecting rods 26 with respect to the lateral side connecting members 32. Due to this structure, as shown in FIGS. 2 and 3, the handle 50 can be swung with respect to the frame part 20, and the linear portions 51a of the handle 50 can be moved on the lateral sides of the armrests 28 along the armrests 28.

The handle 50 is provided, on the pair of linear portions 51a capable of moving along the lateral sides of the armrests 28, with engagement members 55. Each of the engagement members 55 on the linear portions 51a is configured to be slidable along the corresponding linear portion 51a. In addition, the handle 50 is equipped, on the intermediate portion 51b, with a remote operation device 53 for remotely operating sliding of the engagement members 55. On the other hand, as shown in FIGS. 2 and 3, each of the armrests 28 has a pair of engagement projections 30a and 30b (engagement projections are omitted in FIG. 1) to be engaged with engagement members 55 for restricting rotation of the handle 50. By operating the remote operation device 53 so as to slide the engagement members 55 upward, the engagement members 55 and the engagement projections 30a or 30b can be disengaged from each other.

By engaging the front engagement projection 30a and the engagement member 55 so as to be locked to each other, as shown in FIG. 3, the handle 50 is fixed on a first position (face-to-face pushing position) P1. When the handle 50 is fixed on the first position P1, the handle 50 adopts a posture where the handle 50 is inclined forward of the stroller 10 (inclined toward the front leg 22) from a position (position indicated by the chain lines in FIG. 3) in which the handle 50 is inverted on the rotational axis line (swing center) along the vertical axis when viewed from the lateral side, and the handle 50 is extended substantially in parallel with the rear legs 24. The operator can push and advance the stroller 10, grasping the handle 50 from a position on a side of the front legs 24 on which the operator faces the baby. At this time, the rear legs 24 of the stroller 10 face the forward side in the traveling direction.

On the other hand, by engaging the rear engagement projection 30b and the engagement member 55 so as to be locked to each other, as shown in FIG. 2, the handle 50 is fixed on a second position (backside pushing position) P2. When the handle 50 is fixed on the second position P2, the handle 50 adopts a posture where the handle 50 is inclined rearward of the stroller 10 (inclined toward the rear legs 24) from a position (position indicated by the chain lines in FIG. 2) in which the handle 50 is inverted on the rotational axis line (swing center) along the vertical axis when viewed from the lateral side, and the handle 50 is extended substantially in parallel with the connecting rod 26. The operator can push and advance the stroller 10 with the baby facing forward in the traveling direction, grasping the handle 50 from a position on a side of the rear legs 24 of the stroller 10, i.e., from a back side of the baby. At this time, the front legs 22 of the stroller 10 face the forward side in the traveling direction.

The stroller 10 having the overall structure as described above can be folded by rotating the respective constituent members. To be specific, by pulling upward the handle 50 on the second position P2 at first, and then by pushing downward the handle 50, the bracket 34 is rotated clockwise in FIG. 2 with respect to the rear leg 24. In accordance with this operation, the armrest 28 and the lateral side connecting member 32 are rotated clockwise in FIG. 2 with respect to the connecting rod 26. By means of these operations, the handle 50 and the front leg 22 become substantially in parallel with each other when viewed from the lateral side, and the position of the handle 50 can be lowered. In this manner, the stroller 10 can be folded, so that the dimensions of the stroller can be reduced in the back and forth direction and in the up and down direction. On the other hand, in order to unfold the folded stroller 10, the above folding steps are reversely performed.

Figure 4:
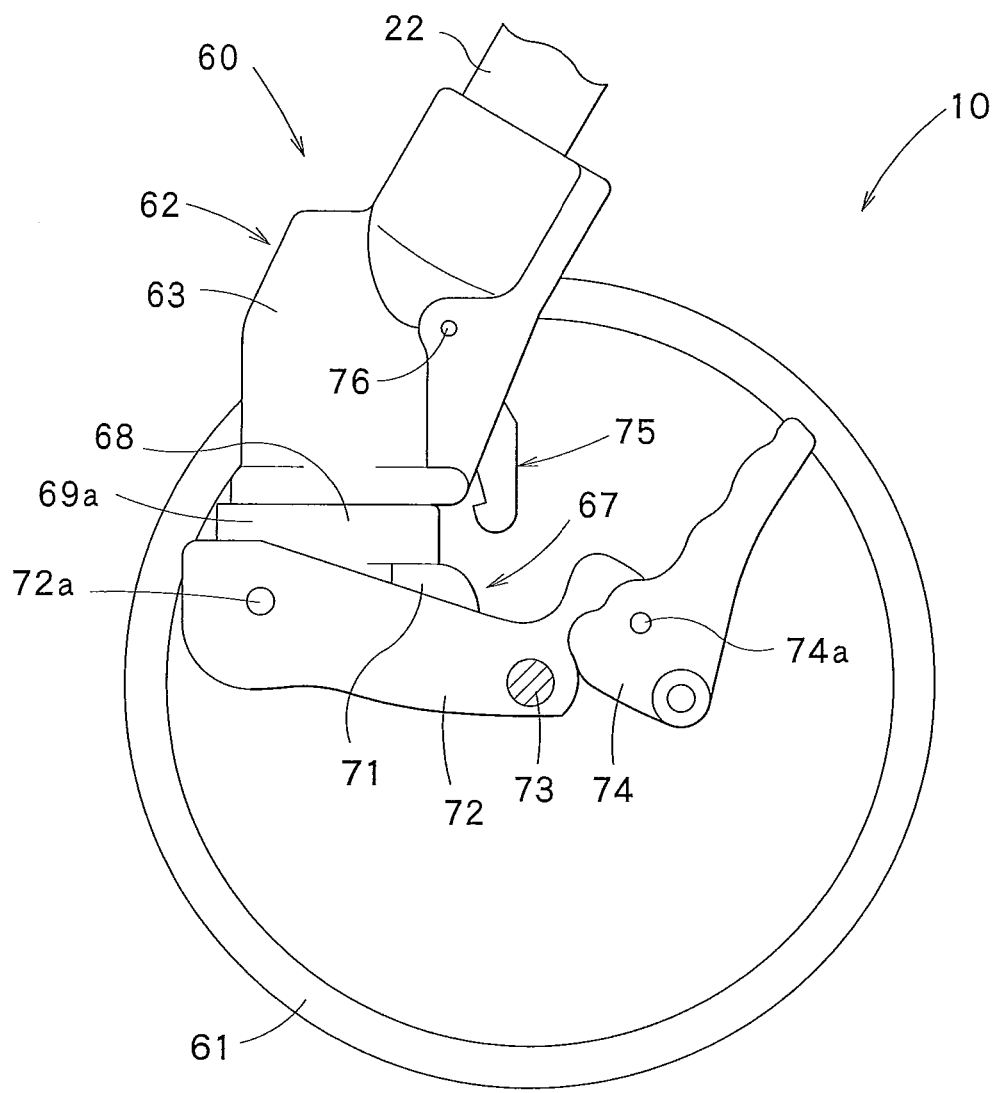
FIG. 4 is a side view showing a caster mechanism for front leg.
Figure 5:
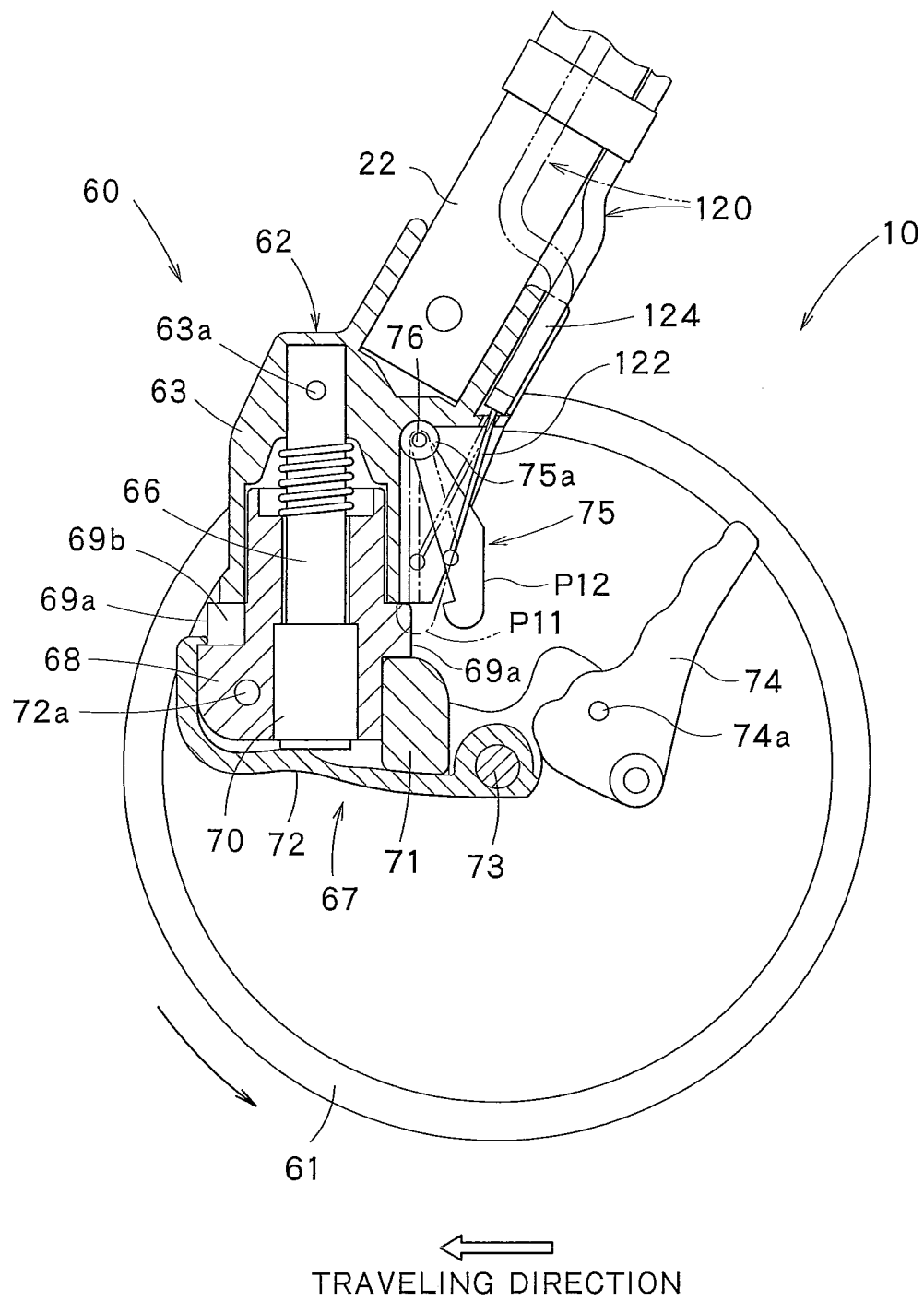
FIG. 5 is a longitudinal sectional view of the caster mechanism for front leg shown in FIG. 4, with a locking means being arranged on an unlocking position.
Figure 6:
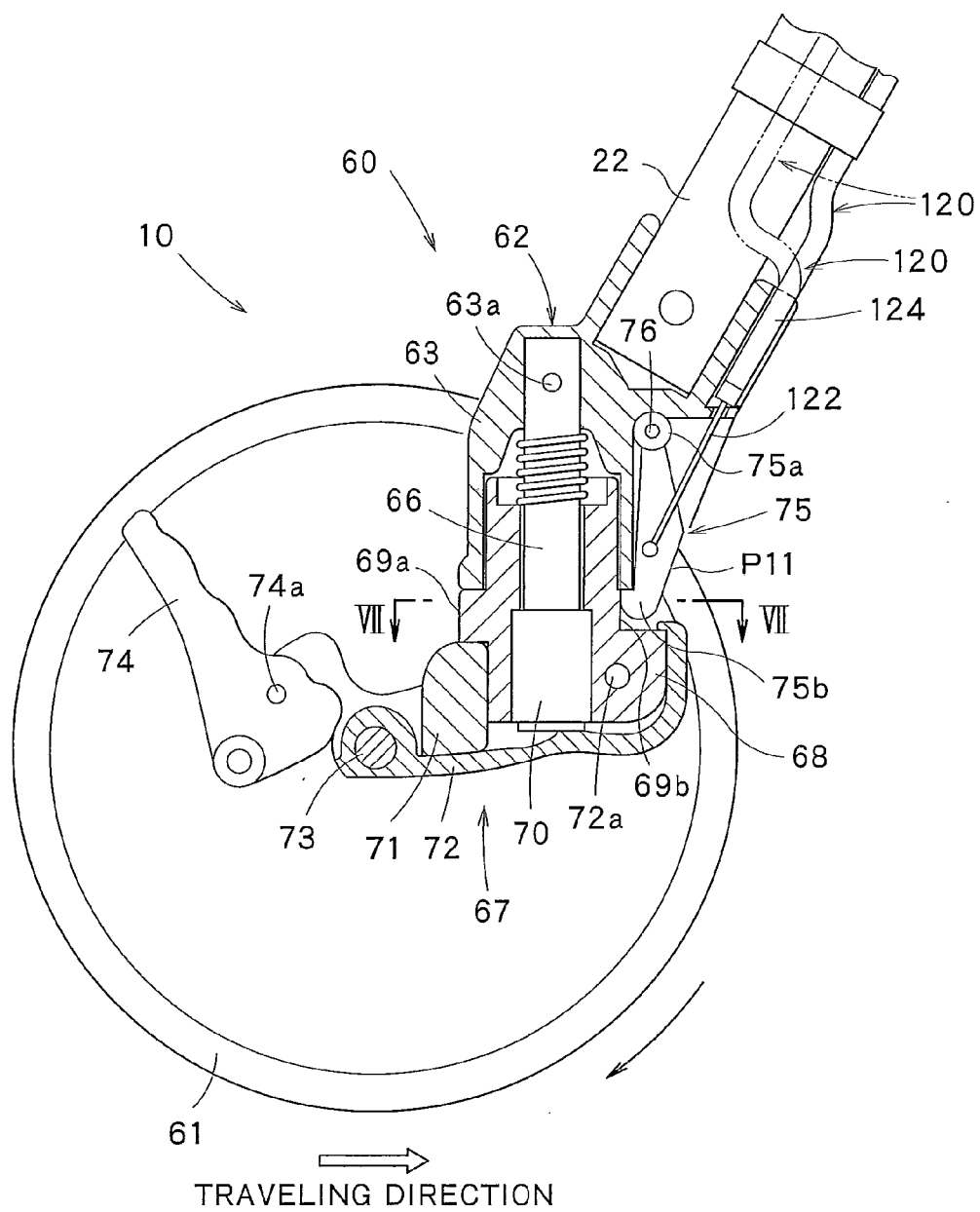
FIG. 6 is a longitudinal sectional view corresponding to FIG. 5, with the locking means being arranged on a locking position.

Next, the caster mechanism for front leg 60 is described with reference to FIGS. 4 to 7. As described above, the caster mechanisms for front leg 60 are disposed on the respective lower ends of the pair of front legs 22. The two caster mechanisms for front leg 60 have the same structure. As shown in FIGS. 4 to 6, the caster mechanism 60 includes: a front wheel (wheel) 61; a wheel holder 62 that holds the front wheel 61 so as to be rotatable in the back and forth direction of the stroller 10 and so as to be turnable relative to the back and forth direction of the stroller 10; and a locking means 75 disposed on the wheel holder 62, and capable of moving between a locking position P11 for restricting the turning of the wheel 61, and an unlocking position P12 for enabling the turning of the wheel 61. As shown in FIGS. 5 and 6, the wheel holder 62 includes: a base part 63 fixed on the front leg 22; a shaft member 66 fixed on the base part 63 through a pin 63a; and a holding part 67 connected to the shaft member 66.

The holding part 67 has a first member 68 connected to the shaft member 66 through a bearing 70, and a second member 72 connected to the first member 68 through a pin 72a. The shaft member 66 is extended substantially perpendicularly to the ground on which the stroller 10 in the unfolded state rests. The first member 68 is rotatable with respect to the shaft member 66 through the bearing 70 about a longitudinal axis line of the shaft member 66. The second member 72 holds a rotational shaft 73. Disposed respectively on opposed ends of the rotational shaft 73 are the front wheels 61. Namely, the second member 72 holds the wheels 61 disposed on opposed sides of the second member 72 such that the wheels 61 can be rotated. With the rotation of the first member 68 with respect to the shaft member 66, the wheels 61 can be turned relative to the back and forth direction of the stroller 10. In FIGS. 4 to 6, illustration of one of the front wheels 61 is omitted.

The rotational shaft 73 is laterally extended at a position displaced from the axis line of the shaft member 66 along the back and forth direction of the stroller 10. Thus, when the stroller 10 is steered, the front wheels 61 can be turned relative to the back and forth direction of the stroller 10 such that the axis line of the shaft member 66 is positioned forward of the rotational shaft 73 in the traveling direction. FIG. 5 shows the caster mechanism 60 when the stroller 10 is steered with the front leg 22 facing forward in the traveling direction, and FIG. 6 shows the caster mechanism 60 when the stroller 10 is steered with the rear leg 24 facing forward in the traveling direction.

As shown in FIGS. 4 to 6, between the first member 68 and the second member 72, there is disposed a resilient member 71 formed of, e.g., rubber. The resilient member 71 absorbs irregularities of a road on which the stroller 10 travels, to thereby improve stability and comfortableness of the stroller 10. A braking member 74 is swingably disposed on the second member 72 through a pin 74a. When the braking member 74 is swung with respect to the second member 72, the braking member 74 is brought into contact with the wheel 61 so as to stop rotation of the wheel 61. Namely, the braking member 74 serves as a brake of the stroller 10.

As shown in FIGS. 5 and 6, the base part 63 is provided with the locking member 75 serving as the locking means. One end 75a of the locking member 75 is connected to the base part 63 through a pin 76. The locking member 75 is swingable with respect to the base part 63 about the pin 76. As shown in FIGS. 5 and 6, the locking member 75 can be moved between the locking position P11 at which the locking member 75 is engaged with the holding part 67, and the unlocking position P12 at which the locking member 75 is not engaged with the holding part 67. As described in detail below, the locking member 75 is connected to a sliding member 110 of a switch mechanism 100 through a first transmission means 120. The first transmission means 120 is extended to the switch mechanism 100 via an outer surface of the tubular front leg 22 and an outer surface of the tubular rear leg 24 (see, FIGS. 10 and 11). As described below, switching of the locking member 75 between the locking position P11 and the unlocking position P12 is operated by the stitch mechanism 100 through the first transmission means 120.

Figure 7:
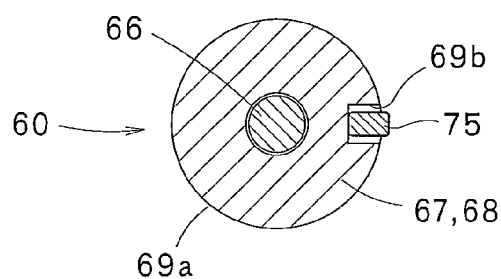
FIG. 7 is a sectional view taken along the line VII-VII in FIG. 6.

As clearly shown in FIGS. 6 and 7, a part of the first member 68 to be engaged with the locking member 75 is formed to have a substantially cylindrical shape. As shown in FIG. 7, a recess 69b for receiving the locking member 75 is formed in a part of a cylindrical outer circumferential surface 69a. The locking position P11 of the locking member 75 is a position where the locking member 75 is fitted in the recess 69b so as to restrict the rotation of the first member 68 with respect to the shaft member 66.

In this structure, when the locking member 75 is arranged on the locking position P11, the turning movement of the wheel 61 relative to the back and forth direction of the stroller 10 is restricted. Hereafter, the state in which the turning movement of the wheel is restricted is also referred to simply as "locking condition". As shown in FIG. 6, when the locking member 75 is fitted in the recess 69b of the first member 68, the rotational shaft 73 is laterally extended so that the front wheel 61 is parallel to the back and forth direction of the stroller 10, and the axis line of the shaft member 66 is positioned nearer the rear leg 24 than the axis line of the rotational shaft 73. On the other hand, when the locking member 75 is arranged on the unlocking position P12, the first member 68 can be rotated with respect to the shaft member 66 so that the restriction of the turning movement of the front wheel 61 with respect to the back and forth direction is released.

The locking member 75 is urged by a torsion spring, not shown, from the unlocking position P12 toward the locking position P11. Thus, when the first transmission means 120 is in a relaxed condition, the locking member 75 is in contact with the cylindrical outer circumferential surface 69a, or fitted in the recess 69b.

Figure 8:
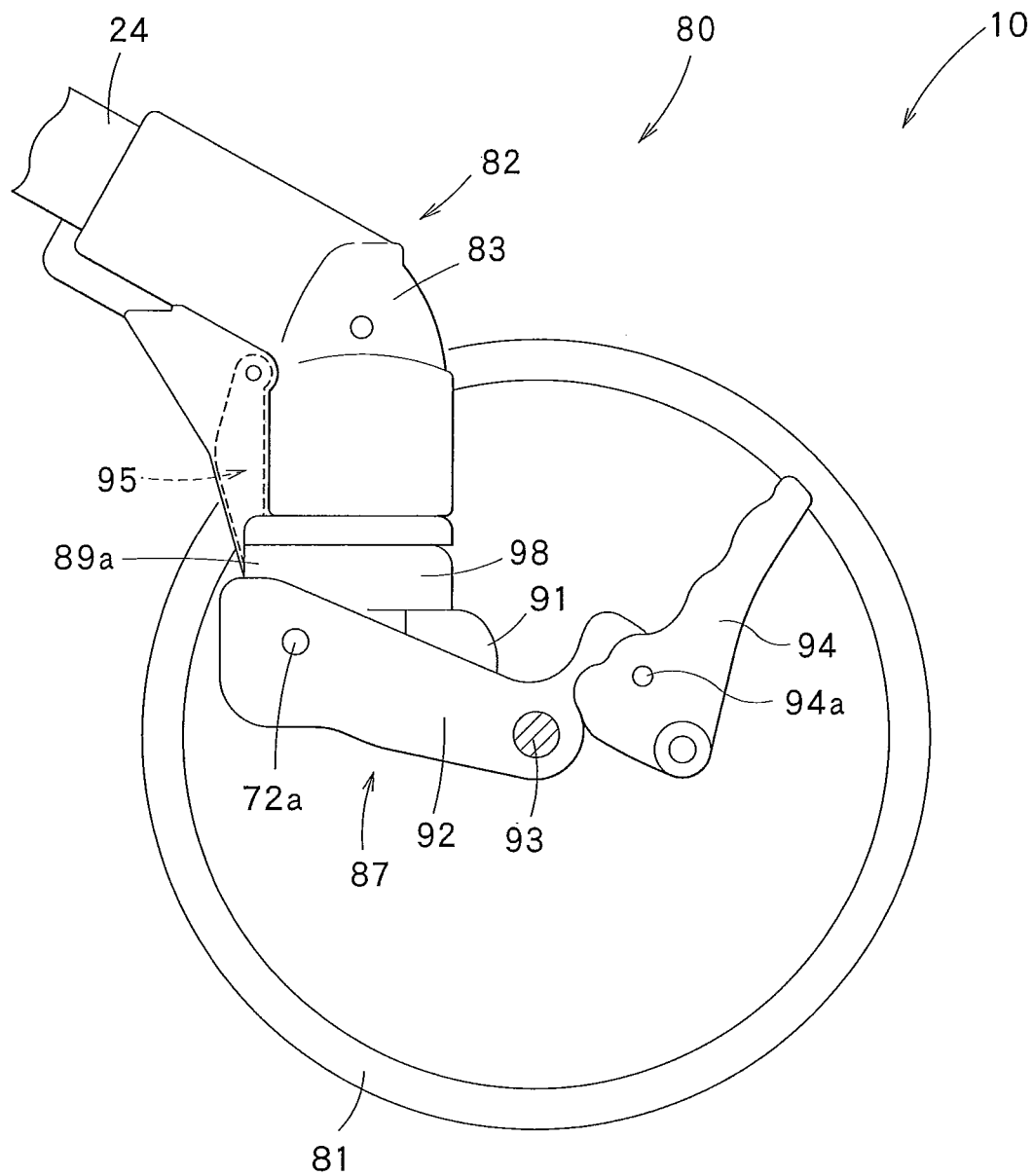
FIG. 8 is a side view of a caster mechanism for rear leg.
Figure 9:
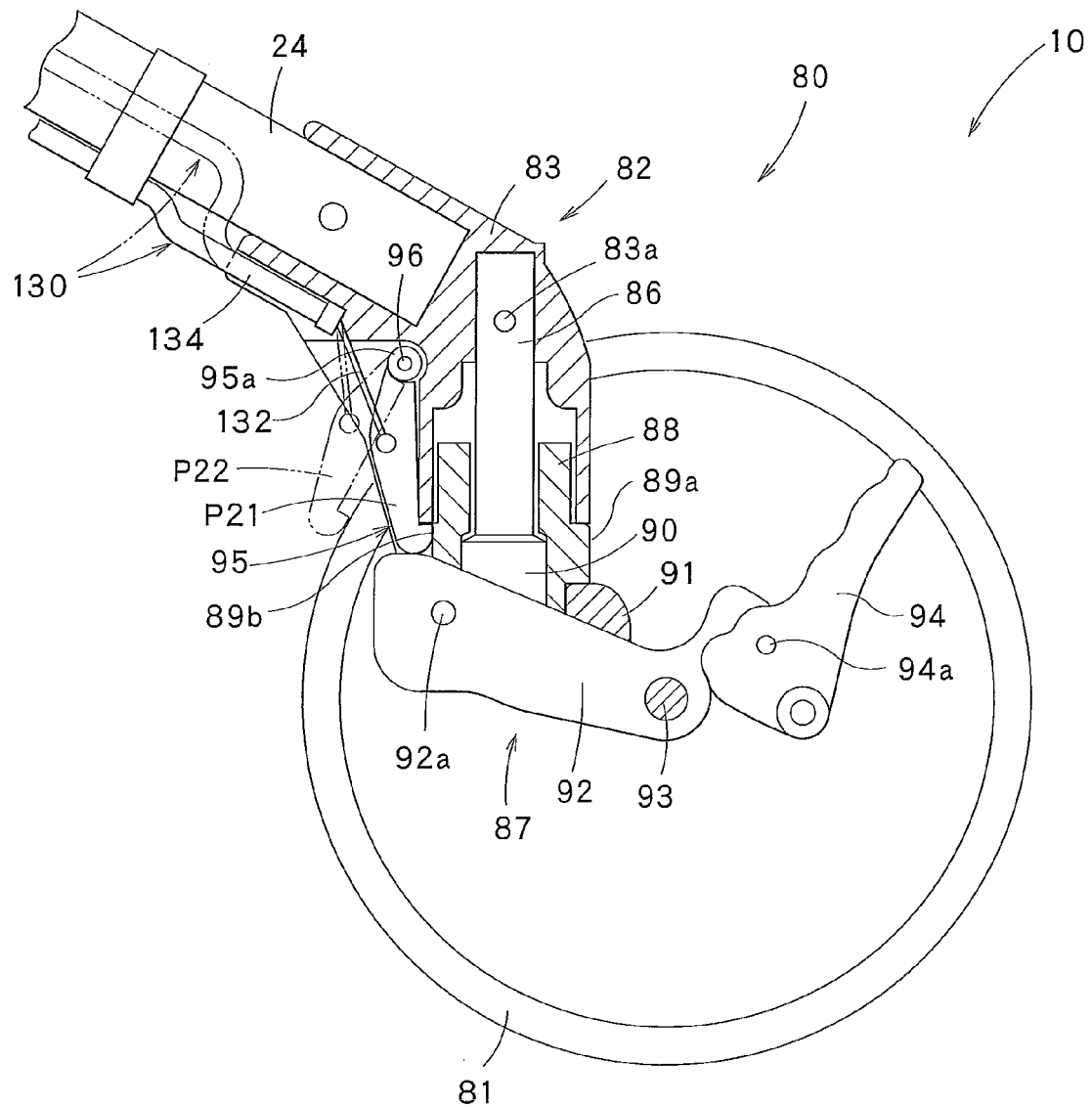
FIG. 9 is a longitudinal sectional view of the caster mechanism for rear leg shown in FIG. 8, with a locking means being arranged on a locking position.

Next, there are described, with reference to FIGS. 8 and 9, the caster mechanisms for rear leg 80 disposed on the respective lower ends of the pair of rear legs 24. The two caster mechanisms for rear leg 80 have the same structure. In addition, the caster mechanism for rear leg 80 has substantially the same structure as that of the caster mechanism for front leg 60. Namely, as shown in FIGS. 8 and 9, the caster mechanism 80 includes: a rear wheel (wheel) 81; a wheel holder 82 that holds the rear wheel 81 so as to be rotatable in the back and forth direction of the stroller 10 and so as to be turnable relative to the back and forth direction of the stroller 10; and a locking means 95 disposed on the wheel holder 82, and capable of moving between a locking position P21 for restricting the turning of the wheel 81, and an unlocking position P22 for enabling the turning of the wheel 81. As shown in FIG. 9, the wheel holder 82 includes: a base part 83 fixed on the rear leg 24; a shaft member 86 fixed on the base part 83 through a pin 83a; and a holding part 87 connected to the shaft member 86.

As shown in FIG. 9, the holding part 87 has a first member 88 connected to the shaft member 86 through a bearing 90, and a second member 92 connected to the first member 88 through a pin 92a. The shaft member 86 is extended substantially perpendicularly to the ground on which the stroller 10 in the unfolded state rests. The second member 92 rotatably holds the pair of wheels 81 through a rotational shaft 93. With the rotation of the first member 88 with respect to the shaft member 86, the wheels 81 can be turned relative to the back and forth direction of the stroller 10. In FIGS. 8 and 9, illustration of one of the rear wheels 81 is omitted.

The rotational shaft 93 is laterally extended at a position displaced from the axis line of the shaft member 86 along the back and forth direction of the stroller 10. Thus, the wheels 81 can be easily turned relative to the back and forth direction in accordance with changes of the traveling direction of the stroller 10. As shown in FIGS. 8 and 9, between the first member 88 and the second member 92, there is disposed a resilient member 91 formed of e.g., rubber. In addition, a braking member 94 is swingably disposed on the second member 92 through a pin 94a.

As shown in FIG. 9, the base part 83 is provided with the locking member 95 serving as the locking means. One end 95a of the locking member 95 is connected to the base part 83 through a pin 96. The locking member 95 is swingable with respect to the base part 83 about the pin 96. As shown in FIG. 9, the locking member 95 can be moved between the locking position P21 at which the locking member 95 is engaged with the holding part 87, and the unlocking position P22 at which the locking member 95 is not engaged with the holding part 87. As described in detail below, the locking member 95 is connected to the sliding member 110 of the switch mechanism 100 through a second transmission member 130. The second transmission means 130 is extended to the switch mechanism 100 via the outer surface of the tubular rear leg 24 (see, FIGS. 10 and 11). As described below, switching of the locking member 95 between the locking position P21 and the unlocking position P22 is operated by the switch mechanism 100 through the second transmission means 130.

Similarly to the caster mechanism for front leg 60, a part of the first member 88 to be engaged with the locking means 95 is formed to have a substantially cylindrical shape. A recess 89b for receiving the locking member 95 is formed in a part of a cylindrical outer circumferential surface 89a. The locking position P21 of the locking member 95 is a position where the locking member 95 is fitted in the recess 89b so as to restrict the rotation of the first member 88 with respect to the shaft member 86. As shown in FIG. 9, when the locking member 95 is fitted in the recess 89b of the first member 88, the rotational shaft 93 is laterally extended so that the rear wheel 81 is parallel to the back and forth direction of the stroller 10, and the axis line of the shaft member 86 is positioned nearer the front leg 22 than the axis line of the rotational shaft 93.

The locking member 95 is urged by a torsion spring, not shown, from the unlocking position P22 toward the locking position P21. Thus, when the second transmission means 130 is in a relaxed condition, the locking member 95 is in contact with the cylindrical outer circumferential surface 89a, or fitted in the recess 89b.

Figure 10:
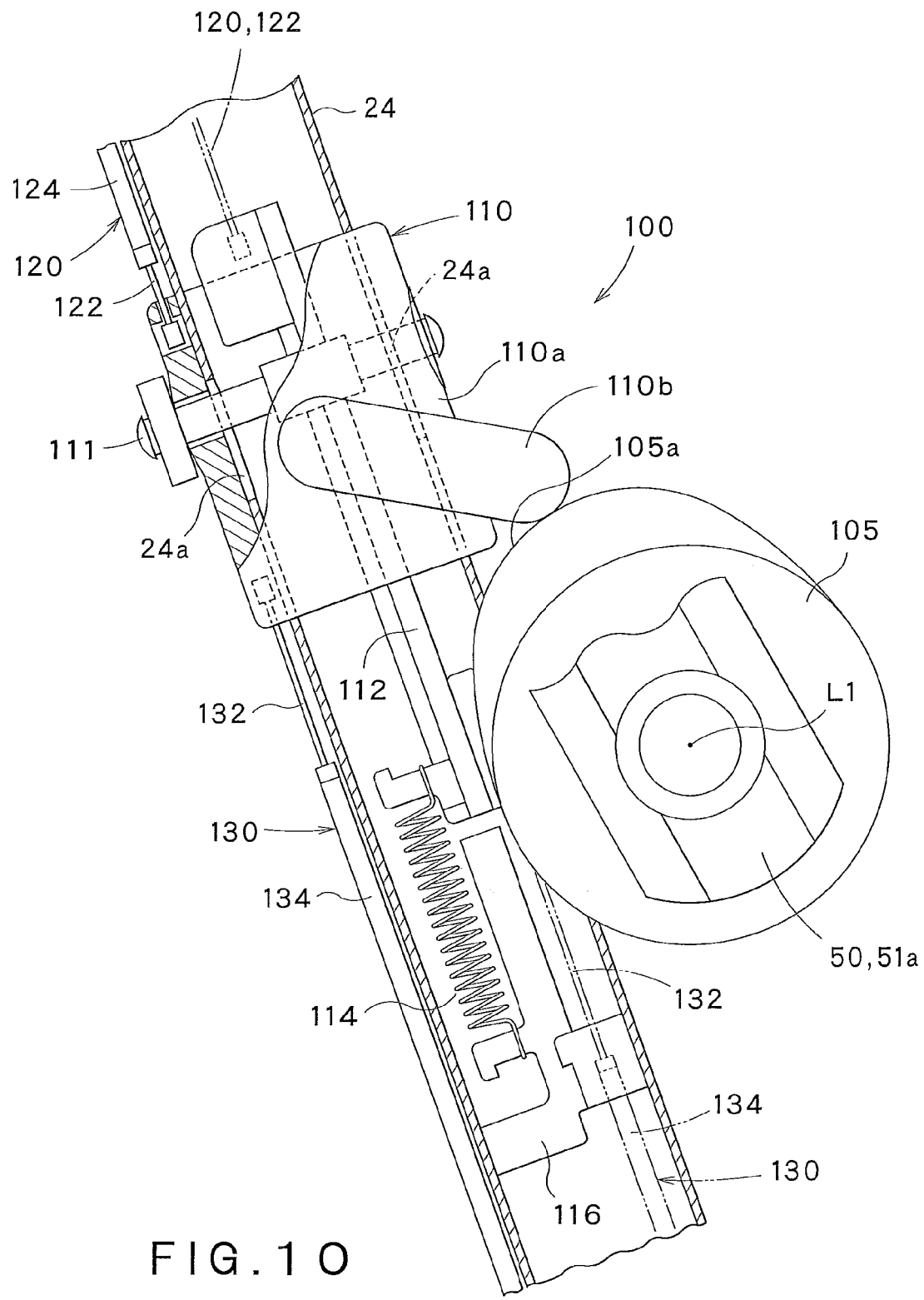
FIG. 10 is a partial sectional view for explaining a switch mechanism, showing a part around the switch mechanism, with the handle being arranged on the first position (face-to-face pushing position)

Next, the switch mechanisms 100 are described. The stroller 10 in this embodiment is provided with a pair of the switch mechanisms 100 respectively disposed on the right side and the left side. Each of the switch mechanisms 100 is related to the corresponding (right or left) caster mechanisms 60 and 80 and the corresponding (right or left) linear portion 51a of the handle 50. The two switch mechanisms 100 have the same structure. As shown in FIGS. 2, 3, and 10, the switch mechanism 100 includes a switching member 105 disposed on the handle 50, and the sliding member 110 disposed on the rear leg 24 so as to be slidable with respect to the rear leg 24. Illustration of the switching member 105 is omitted in FIG. 1.

Figure 11:
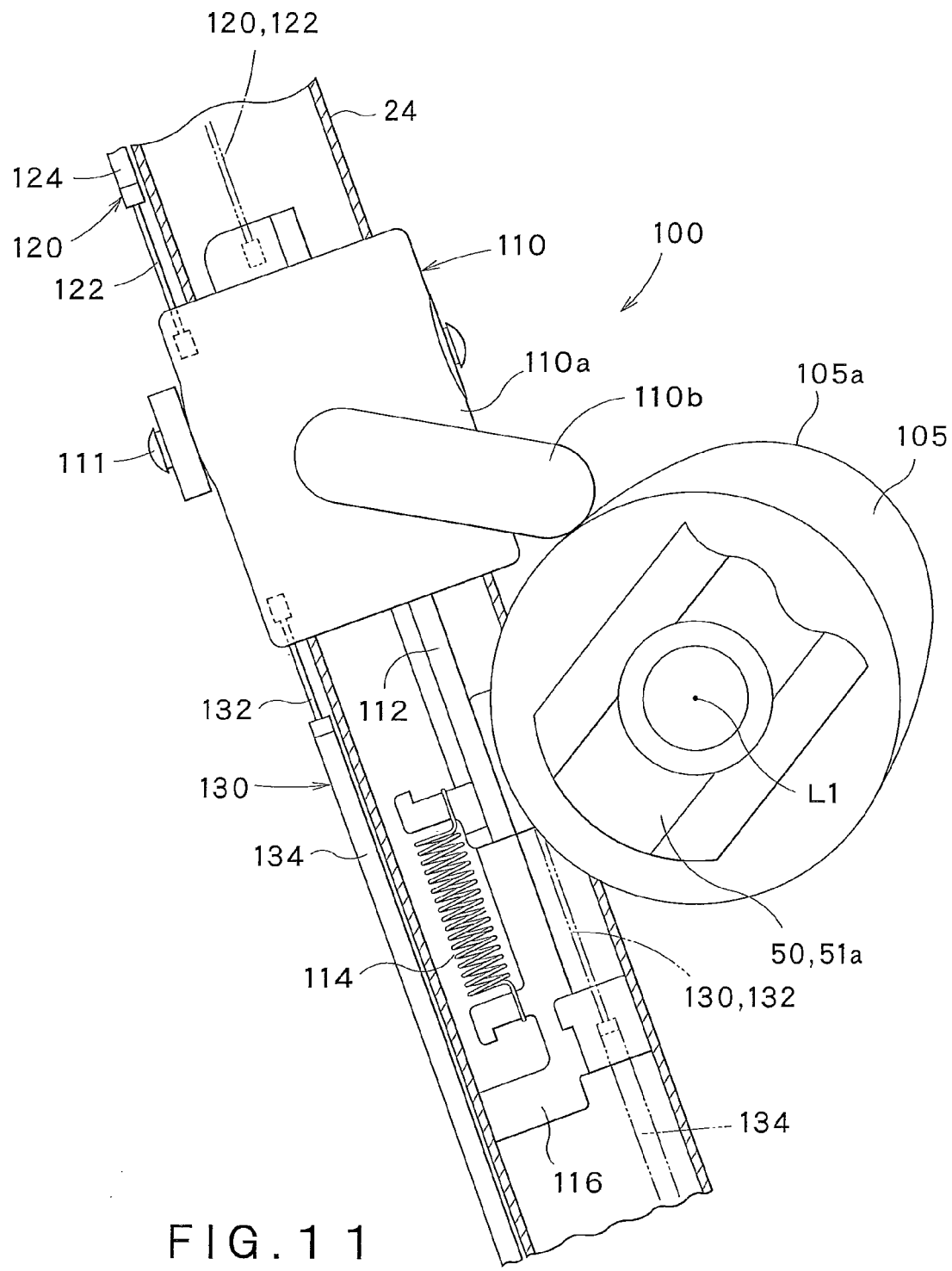
FIG. 11 is a partial sectional view for explaining the switch mechanism, showing the part around the switch mechanism, with the handle being arranged on the second position (backside pushing position)

The switching member 105 acts (moves or rotates), in accordance with an action of the handle 50, about a swing center (swing axis line) L1 of the handle 50. In this embodiment, the switching member 105 is disposed on the swing center L1 of the handle 50. Thus, in accordance with the swinging of the handle 50, the switching member 105 is rotated about the swing center L1 of the handle 50. As shown in FIGS. 10 and 11, when viewed from the lateral side, i.e., when observed from a direction along the rotational axis line L1 of the switching member 105, the switching member 105 has a cam surface (contact surface) 105a of an elliptical contour, so that the switching member 105 can function as a cam.

The sliding member 110 includes a tubular part 110a through which the rear leg 24 passes, and a contact part 110b extended from the cylindrical part 110 to be in contact with the switching member 105. As shown in FIG. 10, the tubular part 110a is pierced by one shaft 111 that passes through a pair of elongated holes 24a formed in the rear leg 24. The elongated holes 24a are extended along a longitudinal direction of the rear leg 24. Due to this structure, the sliding member 110 is slidably held on the rear leg 24. When the handle 50 on the second position (see, FIGS. 2 and 11) is swung to the first position, as shown in FIGS. 3 and 10, the cam surface 105a of the switching member 105 pushes upward the contact part 110b, to thereby slide the sliding member 110 toward the side of the armrest 28 along the rear leg 24. On the other hand, when the handle 50 on the first position (see, FIGS. 3 and 10) is swing to the second position, as shown in FIGS. 2 and 11, the cam surface 105a is moved apart from the contact part 110b, so that the sliding member 110 is slid toward the side of the caster mechanism 80.

As apparent from FIGS. 1 to 3, the swing center L1 of the handle 50 is positioned near the rear leg. Thus, the sliding member 110 can be located near the swing center L1 of the handle 50, which eliminates a necessity for largely projecting the contact part 110b from the tubular part 110a. Thus, the contact part 110b of the sliding member 110 can be pushed by the cam surface 105a of the switching member 105 along a direction that does not define a large angle with respect to the longitudinal direction of the rear leg 24. Therefore, the sliding member 110 can be smoothly slid by the switching member 105 along the rear leg 24.

As shown in FIGS. 10 and 11, the rear leg 24 has a tubular shape. Disposed in the rear leg 24 are a connecting device 112, a fixing device 116, and a spring 114 connecting the connecting device 112 and the fixing device 116. The connecting device 112 is connected to the shaft 111 passing through the tubular part 110a, so as to be movable along the rear leg 24 together with the sliding member 110. On the other hand, the fixing device 116 is fixed on the rear leg 24. The spring 114 pulls the connecting device 112 toward the fixing device 116 fixed in the rear leg 24. Namely, the sliding member 110 is urged by the spring 114 along the rear leg 24 from the side of the armrest 28 toward the side of the caster mechanism 80.

Next, the transmission means 120 and 130 are described. As described above, the two first transmission means 120 are disposed, respectively on the right side and the left side, between the caster mechanisms for front leg 60 and the switch mechanisms 100. The two transmission mechanisms 120 have the same structure. Meanwhile, the two second transmission means 130 are disposed, respectively on the right side and the left side, between the caster mechanisms for rear leg 80 and the switch mechanisms 100. The two transmission means 130 have the same structure. The respective transmission means 120 and 130 are configured to transmit an action of the sliding member 110 to the locking means 75 and 95, so as to move the locking means 75 and 95 from the unlocking positions P12 and P22 to the locking positions P11 and P21, or from the locking positions P11 and P21 to the unlocking positions P12 and P22. In this embodiment, the first transmission means 120 and the second transmission means 130 have the same structure, although the location thereof are different from each other.

The first transmission means 120 includes a lead wire 122 whose opposed ends are respectively fixed to the sliding member 110 of the switch mechanism 100 and the locking means 75 of the caster mechanism for front leg 60, and a tubular member 124 through which the lead wire 122 passes. As shown in FIGS. 5, 6, 10, and 11, opposed ends of the tubular member 124 are fixed on the rear leg 24 and the base part 63 of the caster mechanism for front leg 60. The tubular member 124 is extended along the outer surface of the front leg 22 to the armrest 28, and is further extended along the outer surface of the rear leg 24 from the upper end of the rear leg 24 to the switch mechanism 100. The tubular member 124 is suitably held and fixed on the frame part 20 between the caster mechanism for front leg 60 and the switch mechanism 100. The lead wire 122 is slidable in the tubular member 124. Namely, the lead wire 122 can be relatively moved, with respect to the tubular member 124, toward the side of the switch mechanism 100 and toward the side of the caster mechanism for front leg 60.

Similarly to the first transmission means 120, the second transmission means 130 includes a lead wire 132 whose opposed ends are respectively fixed to the sliding member 110 of the switch mechanism 100 and the locking means 95 of the caster mechanism for rear leg 80, and a tubular member 134 through which the lead wire 132 passes. As shown in FIGS. 9 to 11, opposed ends of the tubular member 134 are fixed on the rear leg 24 and the base part 83 of the caster mechanism for rear leg 80. The tubular member 134 is extended along the outer surface of the rear leg 24 to the caster mechanism for rear leg 80. The tubular member 134 is suitably held and fixed on the frame part 20 between the caster mechanism for rear leg 80 and the switch mechanism 100.

The lead wire 132 is slidable in the tubular member 134. Namely, the lead wire 132 can be relatively moved, with respect to the tubular member 134, toward the side of the switch mechanism 100 and toward the side of the caster mechanism for rear leg 80.

Due to this structure, when the sliding member 110 of the switch mechanism 100 is slid along the rear leg 24 toward the side of the armrest 28 (upward) (state shown in FIG. 10), the lead wire 122 of the first transmission means 120 is pushed into the tubular member 124 from the end of the tubular member 124 on the side of the switch mechanism 100, and is pushed outside the tubular member 124 from the end of the tubular member 124 on the side of the caster mechanisms for font leg 60. As a result, the locking means 75 connected to the end of the lead wire 122 on the side of the caster mechanism 60 can be moved from the unlocking position P12 to the locking position P11. Similarly, the lead wire 132 of the second transmission means 130 is drawn outside the tubular member 134 from the end of the tubular member 134 on the side of the switch mechanism 100, and is drawn into the tubular member 134 from the end of the tubular member 134 on the side of the caster mechanism for rear leg 80. As a result, the locking means 95 connected to the end of the lead wire 132 on the side of the caster mechanism 80 is moved from the locking position P21 to the unlocking position P22.

On the other hand, when the sliding member 110 of the switch mechanism 100 is slid along the rear leg 24 toward the side of the caster mechanism 80 (downward) by the urging force of the spring 114 (state shown in FIG. 11), the lead wire 122 of the first transmission means 120 is drawn outside the tubular member 124 from the end of the tubular member 124 on the side of the switch mechanism 100, and is drawn into the tubular member 124 from the end of the tubular member 124 on the side of the caster mechanism for front leg 60. As a result, the locking member 75 connected to the end of the lead wire 122 on the side of the caster mechanism 60 is moved from the locking position P11 to the unlocking position P12. Similarly, the lead wire 132 of the second transmission means 130 is pushed into the tubular member 134 from the end of the tubular member 124 on the side of the switch mechanism 100, and is pushed outside the tubular member 134 from the end of the tubular member 134 on the side of the caster mechanism for rear leg 80. As a result, the locking member 95 connected to the end of the lead wire 132 on the side of caster mechanism 80 can be moved from the unlocking position P22 to the locking position P21.

The force of the spring 114 urging the sliding member 110 of the switch mechanism 100 is greater than forces of torsion springs (not shown), which are disposed on the caster mechanisms, urging the respective locking members 75 and 95 to draw out the lead wires 122 and 132 toward the side of the caster mechanisms. Thus, when the sliding member 110 of the switch mechanism 100 is not pushed toward the side of the armrest 28 by the switching member 105, the sliding member 110 is positioned on the side of the caster mechanism for rear leg 80 (lower position), and the respective lead wires 122 and 132 are in a strained condition.

Next, there is described an operation of the stroller 10 as structure above when the handle 50 is swung.

As described above, by engaging the engagement members 55 of the handle 50 with the front engagement projections 30a disposed on the armrests 28, the handle 50 can be fixed on the first position P1 (see, FIG. 3) in which the handle 50 is inclined toward the front legs 22. In this state, a parent can steer the stroller 10 with the rear legs 24 facing the forward side in the traveling direction, grasping the handle 50 on the first position P1 from the side of the front legs 22 of the stroller 10. Alternatively, by engaging the engagement members 55 of the handle 50 with the rear engagement projections 30b disposed on the armrests 28, the handle 50 can be fixed on the second position (see, FIG. 2). In this state, the parent can steer the stroller 10 with the front legs 22 facing the forward side in the traveling direction, grasping the handle 50 on the second position P2 from the side of the rear legs 24 of the stroller 10. In both cases where the stroller 10 is moved with the front legs 22 or the rear legs 24 facing forward in the traveling direction, it is preferable that, from the view point of manipulability and traveling stability, the wheels facing the forward side in the traveling direction are turnable relative to the back and forth direction, and that the wheels facing the rearward side in the traveling direction are restricted from turning relative to the back and forth direction. In the above stroller, the wheels of the caster mechanisms for front leg 60 and the caster mechanisms for rear leg 80 can be automatically switched, in accordance with a position of the handle 50, between the turnable condition and the unturnable condition, in a stable and reliable manner.

Firstly, a case in which the handle 50 is swung from the second position P2 toward the first position P1 is described in detail. In accordance with the swinging of the handle 50, the switching member 105 of the switch mechanism 100 is rotated, about a rotational axis line corresponding to the swing center (swing axis line) L1 of the handle 50, from the position shown in FIG. 11 to the position shown in FIG. 10. While the handle 50 is being swung from the second position P2 toward the first position P1, the cam surface 105a of the switching member 105 pushes the contact part 110b of the sliding member 110, so that the sliding member 110 is slid along the rear leg 24 toward the side of the armrest 28 (upward). At this time, since the switching member 105 is positioned near the rear leg 24, the switching member 105 pushes the sliding member 110 along a direction substantially in parallel with the longitudinal direction of the rear leg 24. As a result, the sliding member 110 can be significantly smoothly moved by the swinging action of the handle 50.

When the sliding member 110 is moved along the rear leg 24 toward the side of the armrest 28, the locking member 95 of the caster mechanism for rear leg 80 is moved from the locking position P21 to the unlocking position P22, as described above. As a result, the rear wheel 81 automatically comes into the turnable condition.

As described above, when the sliding member 110 is moved along the rear leg 24 toward the side of the armrest 28, the lead wire 122 is relaxed on the side of the caster mechanism for front leg 60 of the tubular member 124 of the first transmission means 120, so that the locking member 75 is brought into contact with the cylindrical outer circumferential surface 69a of the first member 68. Then, by steering the stroller 10 with the rear legs 24 of the stroller 10 facing the forward side in the traveling direction, the wheels 61 are turned relative to the back and forth direction of the stroller 10 (see, FIG. 6), such that the rotational shaft 73 of the front wheels 61 is laterally extended so that the front wheels 61 are parallel to the back and forth direction of the stroller 10, and the axis line of the shaft member 66 of the caster mechanism for front leg is positioned nearer the rear legs 24 to the rotational shaft 73. Thus, the locking member 75 is slid along the cylindrical outer circumferential surface 69a of the first member 68 so as to be fitted in the recess 69b, whereby the locking member 75 of the caster mechanism for front leg 60 is arranged on the locking position P11. As a result, the front wheel 61 automatically comes into the unturnable condition.

In this manner, when the handle 50 is swung from the second position P2 toward the first position P1, the front wheels can be switched from the turnable condition to the unturnable condition in a stable and reliable manner. At the same time, the rear wheels 81 can be switched from the unturnable condition to the turnable condition in a stable and reliable manner.

Secondly, a case in which the handle 50 is swung from the first position toward the second position P2 is described in detail. In accordance with the swinging of the handle 50, the switching member 105 of the switch mechanism 100 is rotated, about the swing center (swing axis line) L1 of the handle 50 as a rotational axis line, from the position shown in FIG. 10 to the position shown in FIG. 11. At this time, the sliding member 110 urged by the spring 114 is slid along the rear leg 24 toward the side of the caster mechanism for rear leg 80 (downward).

When the sliding member 110 is moved along the rear leg 24 toward the side of the caster mechanism for rear leg 80, the locking member 75 of the caster mechanism for front leg 60 is moved from the locking position P11 to the unlocking position P12, as described above. As a result, the front wheel 61 automatically comes into the turnable condition.

As described above, when the sliding member 110 is moved along the rear leg 24 toward the side of the caster mechanism for rear leg 80, the lead wire 132 is relaxed on the side of the caster mechanism for rear leg 80 of the tubular member 134 of the second transmittance means 130, so that the locking member 95 is brought into contact with the cylindrical outer circumferential surface 89*a* of the first member 88. Then, by steering the stroller 10 with the front legs 22 facing the forward side in the traveling direction, the locking member 95 is slid along the cylindrical outer circumferential surface 89*a* of the first member 88 so as to be fitted in the recess 89*b*, whereby the locking member 95 of the caster mechanism for rear leg 80 is arranged on the locking position P21. As a result, the rear wheel 81 automatically comes into the unturnable condition.

In this manner, when the handle 50 is swung from the first position P1 toward the second position P2, the front wheels can be switched from the unturnable condition to the turnable condition in a stable and reliable manner. At the same time, the rear wheels 81 can be switched from the turnable condition to the unturnable condition in a stable and reliable manner.

According to this embodiment, the handle 50 is equipped with the switching member 105 which can act about the swing center of the handle 50 in accordance with the swinging of the handle 50. Since the switching member 105 is positioned on the swing center L1 of the handle 50 or near the swing center L1 so that the switching member 105 can act near the swing center L1, the swinging action of the handle 50 can be transmitted to the locking means 75 and 95 through the transmission means 120 and 130 in a stable and reliable manner, without any influences such as flexure of the constituent members and allowance of the handle 50. Thus, the conditions of the wheels 61 and 81 can be switched in accordance with the position of the handle 50 in a more stable and reliable manner. In addition, since moving amounts of the lead wires 122 and 132 are in proportion to the swinging amount (swinging angle) of the handle 50, the conditions of the locking members 75 and 95 can be continuously changed in accordance with the swinging amount of the handle 50.

Further, according to this embodiment, the sliding member 110 to be engaged with the switching member 105 is slidably disposed on the rear leg 24. When the swing center L1 of the handle 50 is positioned near the rear leg 24, it is possible to allow the switching member 105 to push the sliding member 110 along the direction substantially in parallel with the longitudinal direction of the rear leg 24. In this case, the sliding member 110 can be smoothly slid by the switching member 105 along the rear leg 24. Thus, the conditions of the wheels 61 and 81 can be switched in accordance with the position of the handle 50 in a more stable and reliable manner.

Furthermore, according to the above embodiment, since the transmission means 120 and 130 are held on the outer surface of the front legs 22 and the rear legs 24 of the frame part 20. Thus, routing lines of the transmission means 120 and 130 can be more freely determined. In addition, since the routing lines of the transmission means 120 and 130 can be simplified, the wires 122 and 132 can be smoothly slid in the tubular members 124 and 134.

The above-described embodiment can be variously modified within a scope of the present invention. An example of such a modification is described below.

In the above embodiment, the locking means 75 and 95 are disposed on both of the caster mechanism for front leg 60 and the caster mechanism for rear leg 80, which is given as an example. Not limited thereto, the locking means may be disposed only on one of the caster mechanism for front leg 60 and the caster mechanism for rear leg 80. In this case, the wheel of the caster mechanism free of locking means may be configured to be turnable relative to the back and forth direction of the stroller 10, or may be configured to be parallel to the back and forth direction of the stroller 10 so as to be unturnable.

In addition, the overall structure of the stroller 10 described in the above embodiment is merely an example. For example, the frame part 20 may be structured so as not to be foldable.

Further, the structure of the caster mechanism described in the above embodiment is merely an example. For example, it is possible to employ the structure of the caster mechanism disclosed in JP2002-284015A.

Furthermore, in the above embodiment, the lead wires 122 and 132 are extended along the outer surfaces of the front legs 22 and the outer surfaces of the rear legs 24 of the frame part 20, which is given as an example. Not limited thereto, the lead wires 122 and 132 may be extended in the front legs 22 and the rear legs 24 of the frame part 20.

In the example shown by the two-dot chain lines shown in FIGS. 5, 6, 9, 10, and 11, the ends of the lead wires 122 and 132 on the side of the switch mechanism 100 are connected to the connecting device 112 of the switch mechanism 100. The lead wire 132 of the second transmission means 130 is extended in the tubular rear leg 24 directly to the caster mechanism for rear leg 80. Meanwhile, the lead wire 122 of the first transmission means 120 is extended in the rear leg 24 to the upper end of the rear leg 24, and then the lead wire 122 is inserted into the tubular front leg 22 from the upper end thereof and is extended in the front leg 22 to the caster mechanism for front leg 60.

According to such a stroller 10, a larger part of the transmission means 120 and 130 can be prevented from being exposed outside. Thus, when the stroller 10 is folded, for example, the transmission means 120 and 130 can be prevented from being caught by other constituent members or outside parts.

In addition, in the above embodiment, although the action of the switching member 105 in accordance with the swinging of the handle 50 is transmitted to the sliding member 110, and the action of the sliding member 110 is transmitted to the locking means 75 and 95 by the transmission means 120 and 130, the embodiment is merely an example and is not limited thereto. Moreover, the switch mechanism 100 for converting the swinging action of the handle 50 into another action is not limited to the cam structure as described in the above embodiment, but various known mechanisms such as a link mechanism may be used.

Figure 12:
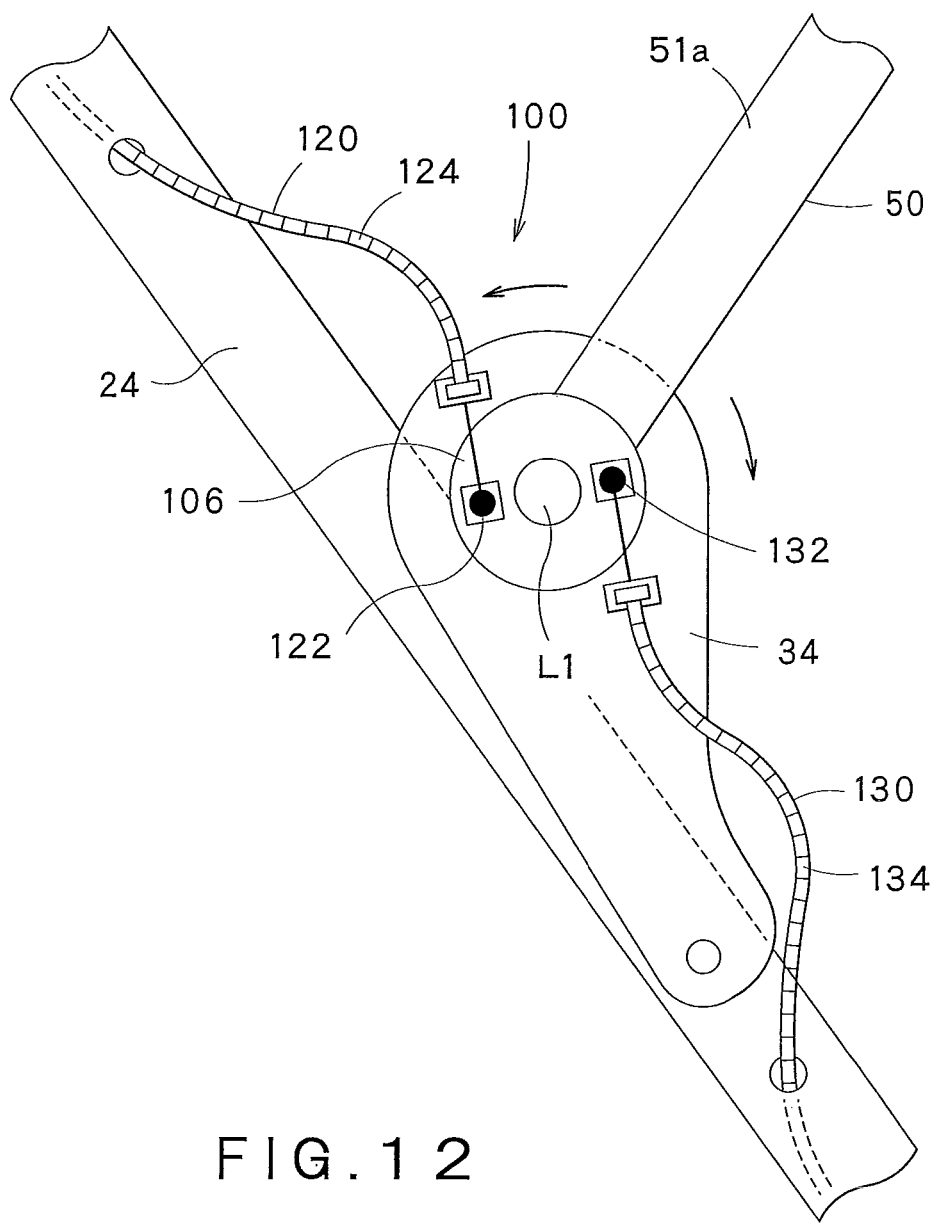
FIG. 12 is a view showing an alternative example of the switch mechanism.

An alternative example of the switch mechanism is described with reference to FIG. 12. In FIG. 12, the same parts as those of the above embodiment shown in FIGS. 1 to 11 are indicated by the same reference numbers, and the detailed description thereof is omitted to avoid duplication.

In the example shown in FIG. 12, a switch mechanism 100 includes a plate-like member, more specifically, a disc (pulley) 106 disposed on the handle 50. The conditions of the locking members 75 and 95 are switched by the disc 106 through the transmission means 120 and 130. Also in the example shown in FIG. 12, the swing center L1 of the handle 50 is positioned near the rear leg 24 when viewed from the lateral side. The disc 106 is placed on the swing center (swing axis line) L1 of the handle 50 such that a center of the disc 106 corresponds to the swing center (swing axis line) L1. Ends of the lead wires 122 and 132 of the respective transmission means 120 and 130 are connected to the disc 106 at positions opposite to each other with respect to the center of the disc 106.

Due to this structure, by swinging the handle 50, the lead wires 122 and 132 can be strained or relaxed. Thus, the conditions of the locking members 75 and 95 can be switched by the swinging action of the handle 50. In particular, also in this example, since the moving amounts of the lead wires 122 and 132 are in proportion to the swinging amount (swinging angle) of the handle 50, it is possible to continuously change the conditions of the locking members 75 and 95 in accordance with the swinging amount of the handle 50. Further, the switch mechanism 100 acts near the swing center L1 of the handle 50, and the action of the switch mechanism 100 is transmitted to the locking means 75 and 95 through the transmission means 120 and 130. Thus, the action of the handle 50 can be stably converted by the switch mechanism 100, and the locking members 75 and 95 can be reliably operated through the transmission means 120 and 130. Furthermore, by adjusting the directions of the ends of the tubular members 124 and 134 of the transmission means 120 and 130, or by rotatably supporting the ends of the tubular members 124 and 134, the lead wires 122 and 132 can be moved along the tubular member 124 and 134. In this case, the sliding action of the lead wires 122 and 132 with respect to the tubular members 124 and 134 can be significantly smoothened, whereby the swinging action of the handle 50 can be transmitted to the locking members 75 and 95 in a more stable and reliable manner.

The invention claimed is:

1. A stroller comprising:
   a frame part including a front leg and a rear leg;
   a handle swingably connected to the frame part;
   a caster mechanism disposed at least on one of the front leg and the rear leg, the caster mechanism including a wheel, a wheel holder configured to rotatably and turnably hold the wheel, and a locking member configured to move between a locking position for restricting a turning of the wheel and an unlocking position for enabling the turning of the wheel;
   a switch mechanism including a switching member that is disposed on the handle and is capable of acting about a swing center of the handle in accordance with a swinging of the handle; and
   a transmission member disposed between the switch mechanism and the caster mechanism and configured to transmit an action of the switch mechanism to the locking member so as to move the locking member from the unlocking position to the locking position, or from the locking position to the unlocking position,
   wherein the switch mechanism further includes a sliding member that is disposed on the rear leg and is capable of sliding with respect to the rear leg,
   wherein the transmission member is disposed between the sliding member of the switch mechanism and the caster mechanism, and configured to transmit an action of the sliding member of the switch mechanism to the locking member,
   wherein the switching member includes a contact surface that contacts with the sliding member so as to slide the sliding member along the rear leg when the switching member acts in accordance with the swinging of the handle, and
   wherein the sliding member is urged along the rear leg so that the sliding member is kept in contact with the contact surface of the switching member during the swing of the handle relative to the frame part.

2. The stroller according to claim 1, wherein the switching member is disposed on the swing center of the handle and is rotatable about the swing center of the handle in accordance with the swinging of the handle.

3. The stroller according to claim 1, wherein the switching member is positioned near the swing center of the handle and is movable about the swing center of the handle in accordance with the swinging of the handle.

4. The stroller according to claim 1, wherein the transmission member includes a wire whose opposed ends are respectively fixed to the sliding member of the switch mechanism and the locking member of the caster mechanism.

5. The stroller according to claim 1, wherein the transmission member includes a wire whose opposed ends are respectively fixed to the switching member of the switch mechanism and the locking member of the caster mechanism.

6. The stroller according to claim 1, wherein:
the switching member is a plate-like member that is disposed on the swing center of the handle and is rotatable about the swing center of the handle in accordance with the swinging of the handle;
the transmission member includes a wire whose opposed ends are respectively fixed to the switching member of the switch mechanism and the locking member of the caster mechanism; and
the swing center of the handle is positioned near the rear leg, and the transmission member, which is held by the rear leg, is extended to the switching member of the switch mechanism.

7. The stroller according to claim 4, wherein the transmission member further includes a tubular member held by the frame part, and the wire passes through the tubular member so as to be slidable with respect to the tubular member.

8. The stroller according to claim 4, wherein the transmission member is held on an outer surface of the front leg or an outer surface of the rear leg of the frame part.

9. The stroller according to claim 4, wherein the wire is extended in the front leg or the rear leg of the frame part.

10. The stroller according to claim 4, wherein the caster mechanism includes a caster mechanism for front leg disposed on a lower end of the front leg, and the wire is extended in the rear leg of the frame part to an upper end of the rear leg, and is further extended in the front leg from an upper end of the front leg to the caster mechanism for front leg.

11. The stroller according to claim 1, wherein the caster mechanism includes a caster mechanism for front leg disposed on a lower end of the front leg and a caster mechanism for rear leg disposed on a lower end of the rear leg, and the first transmission member includes a first transmission disposed between the caster mechanism for front leg and the switch mechanism and a second transmission member disposed between the caster mechanism for rear leg and the switch mechanism.

12. The stroller according to claim 11, wherein when the handle is swung rearward of the stroller, the turning of the wheel of the caster mechanism for front leg is enabled, while the turning of the wheel of the caster mechanism for rear leg is restricted, and when the handle is swung forward of the stroller, the turning of the wheel of the caster mechanism for front leg is restricted, while the turning of the wheel of the caster mechanism for rear leg is enabled.

* * * * *